United States Patent
Natanzon et al.

(10) Patent No.: US 10,235,196 B1
(45) Date of Patent: Mar. 19, 2019

(54) VIRTUAL MACHINE JOINING OR SEPARATING

(71) Applicant: EMC Corporation, Hopkinton, MA (US)

(72) Inventors: Assaf Natanzon, Tel Aviv (IL); Lev Ayzenberg, Petah Tikva (IL); Erez Sharvit, Givat Ella (IL); Slavik Neymer, Petah Tikva (IL); Leehod Baruch, Rishon Leziyon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 14/980,037

(22) Filed: Dec. 28, 2015

(51) Int. Cl.
   *G06F 9/455* (2018.01)
   *G06F 17/30* (2006.01)
   *G06F 11/14* (2006.01)

(52) U.S. Cl.
   CPC ...... *G06F 9/45558* (2013.01); *G06F 11/1471* (2013.01); *G06F 17/30371* (2013.01); *G06F 2009/4557* (2013.01); *G06F 2009/45579* (2013.01); *G06F 2009/45595* (2013.01)

(58) Field of Classification Search
   CPC .......... G06F 9/45558; G06F 11/1471; G06F 11/1469; G06F 11/1456; G06F 11/1446; G06F 17/30371; G06F 17/30575; G06F 17/30174; G06F 17/30191; G06F 17/30368; G06F 2009/45579; G06F 2009/45595
   See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |
| 6,042,652 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |
| 6,174,809 B1 | 1/2001 | Kang et al. |
| 6,203,613 B1 | 3/2001 | Gates et al. |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

Gibson, "Five Point Plan Lies at the Heart of Compression Technology;" Tech Talk; Apr. 29, 1991; 1 Page.

Soules et al., "Metadata Efficiency in Versioning File Systems;" $2^{nd}$ USENIX Conference on File and Storage Technologies; Mar. 31, 2003-Apr. 2, 2003; 16 Pages.

(Continued)

*Primary Examiner* — Jacob D Dascomb
(74) *Attorney, Agent, or Firm* — Daly, Crowley Mofford & Durkee, LLP

(57) ABSTRACT

In one aspect, a method includes separating a set of virtual machines from a first consistency group to a second consistency group and third consistency group. The method also includes combining a first virtual machine of the second consistency group to the third consistency group to form a fourth consistency group.

14 Claims, 7 Drawing Sheets

(56) References Cited

U.S. PATENT DOCUMENTS

| | | |
|---|---|---|
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1* | 8/2013 | Natanzon ............ G06F 17/30017 707/640 |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1* | 9/2014 | Natanzon ............ G06F 11/0712 711/162 |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,047,108 B1* | 6/2015 | Rajaa ................... G06F 9/4856 |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |

(56) References Cited

U.S. PATENT DOCUMENTS

| | | |
|---|---|---|
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,600,377 B1 | 3/2017 | Cohen et al. |
| 9,619,255 B1 | 4/2017 | Natanzon |
| 9,619,256 B1 | 4/2017 | Natanzon et al. |
| 9,619,264 B1 | 4/2017 | Natanzon et al. |
| 9,619,543 B1 | 4/2017 | Natanzon et al. |
| 9,632,881 B1 | 4/2017 | Natanzon |
| 9,639,295 B1 | 5/2017 | Natanzon et al. |
| 9,639,383 B1 | 5/2017 | Natanzon |
| 9,639,592 B1 | 5/2017 | Natanzon et al. |
| 9,652,333 B1 | 5/2017 | Bournival et al. |
| 9,658,929 B1 | 5/2017 | Natanzon et al. |
| 9,659,074 B1 | 5/2017 | Natanzon et al. |
| 9,665,305 B1 | 5/2017 | Natanzon et al. |
| 9,668,704 B2 | 6/2017 | Fuimaono et al. |
| 9,672,117 B1 | 6/2017 | Natanzon et al. |
| 9,678,680 B1 | 6/2017 | Natanzon et al. |
| 9,678,728 B1 | 6/2017 | Shemer et al. |
| 9,684,576 B1 | 6/2017 | Natanzon et al. |
| 9,690,504 B1 | 6/2017 | Natanzon et al. |
| 9,696,939 B1 | 7/2017 | Frank et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2009/0089781 A1* | 4/2009 | Shingai ............... G06F 9/5088 718/1 |
| 2016/0204977 A1* | 7/2016 | Cui ..................... G06F 11/16 370/221 |

OTHER PUBLICATIONS

AIX System Management Concepts: Operating Systems and Devices; Bull Electronics Angers; May 2000; 280 Pages.

Soules et al., "Metadata Efficiency in a Comprehensive Versioning File System;" May 2002; CMU-CS-02-145; School of Computer Science, Carnegie Mellon University; 33 Pages.

"Linux Filesystems," Sams Publishing; 2002; Chapter 1: Introduction to Filesystems pp. 17-22 and Chapter 3: Overview of Journaling Filesystems pp. 67-71; 12 Pages.

Bunyan et al., "Multiplexing in a BrightStor® ARCserve® Backup Release 11;" Mar. 2004; 4 Pages.

Marks, "Network Computing, 33;" Cover Story; Feb. 2, 2006; 8 Pages.

Hill, "Network Computing, NA;" Cover Story; Jun. 8, 2006; 9 Pages.

Microsoft Computer Dictionary, Fifth Edition; 2002; 3 Pages.

Wikipedia; Retrieved on Mar. 29, 2011 from http://en.wikipedia.org/wiki/DEFLATE: DEFLATE; 6 Pages.

Wikipedia; Retrieved on Mar. 29, 2011 from http://en.wikipedia.org/wiki/Huffman_coding: Huffman Coding; 11 Pages.

Wikipedia; Retrieved on Mar. 29, 2011 from http:///en.wikipedia.org/wiki/LZ77: LZ77 and LZ78; 2 Pages.

U.S. Appl. No. 11/609,560.
U.S. Appl. No. 12/057,652.
U.S. Appl. No. 11/609,561.
U.S. Appl. No. 11/356,920.
U.S. Appl. No. 10/512,687.
U.S. Appl. No. 11/536,233.
U.S. Appl. No. 11/536,215.
U.S. Appl. No. 11/536,160.
U.S. Appl. No. 11/964,168.

* cited by examiner

VIRTUAL MACHINE JOINING OR SEPARATING

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes separating a set of virtual machines from a first consistency group to a second consistency group and third consistency group. The method also includes combining a first virtual machine of the second consistency group to the third consistency group to form a fourth consistency group.

In another aspect, an apparatus includes electronic hardware circuitry configured to separate a set of virtual machines from a first consistency group to a second consistency group and third consistency group and combine a first virtual machine of the second consistency group to the third consistency group to form a fourth consistency group.

In a further aspect, an article includes a non-transitory computer-readable medium that stores computer-executable instructions. The instructions cause a machine to separate a set of virtual machines from a first consistency group to a second consistency group and third consistency group and combine a first virtual machine of the second consistency group to the third consistency group to form a fourth consistency group.

DETAILED DESCRIPTION

Described herein are techniques to unify multiple consistency groups (CGs) into a single CG and to separate a CG into more than one CG.

The following definition may be useful in understanding the specification and claims.

I/O REQUEST—an input/output request (sometimes referred to as an I/O), which may be a read I/O request (sometimes referred to as a read request or a read) or a write I/O request (sometimes referred to as a write request or a write);

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

Figure 1:
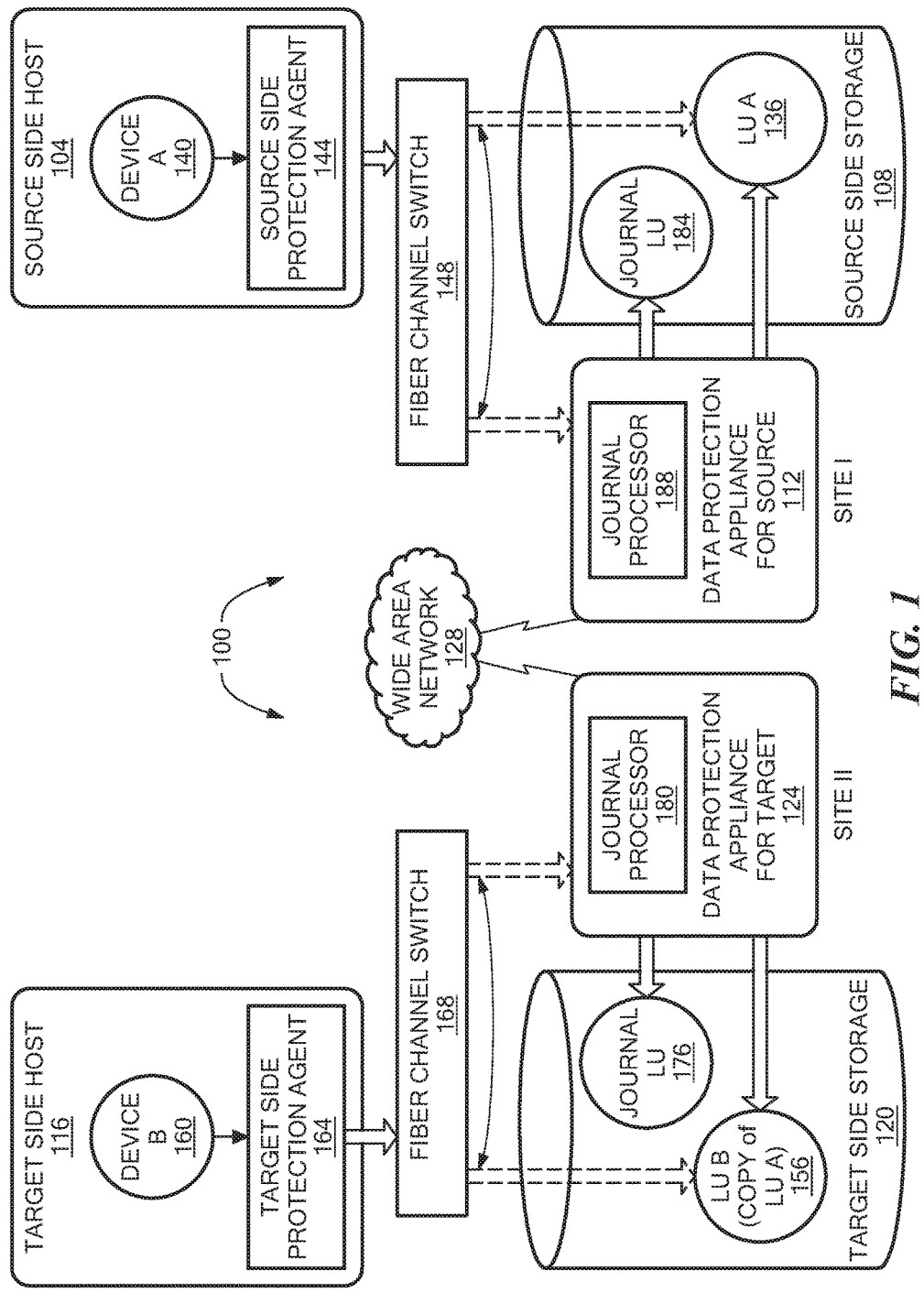
FIG. 1 is a block diagram of an example of a data protection system.

Referring to FIG. 1, a data protection system 100 includes two sites; Site I, which is a production site, and Site II, which is a backup site or replica site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units, generate a distributed file system on them (such as, for example, VMWARE® VMFS® creates files in the file system) and exposes the files as logical units to the virtual machines (e.g., each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (sometimes referred to as a splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus, for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
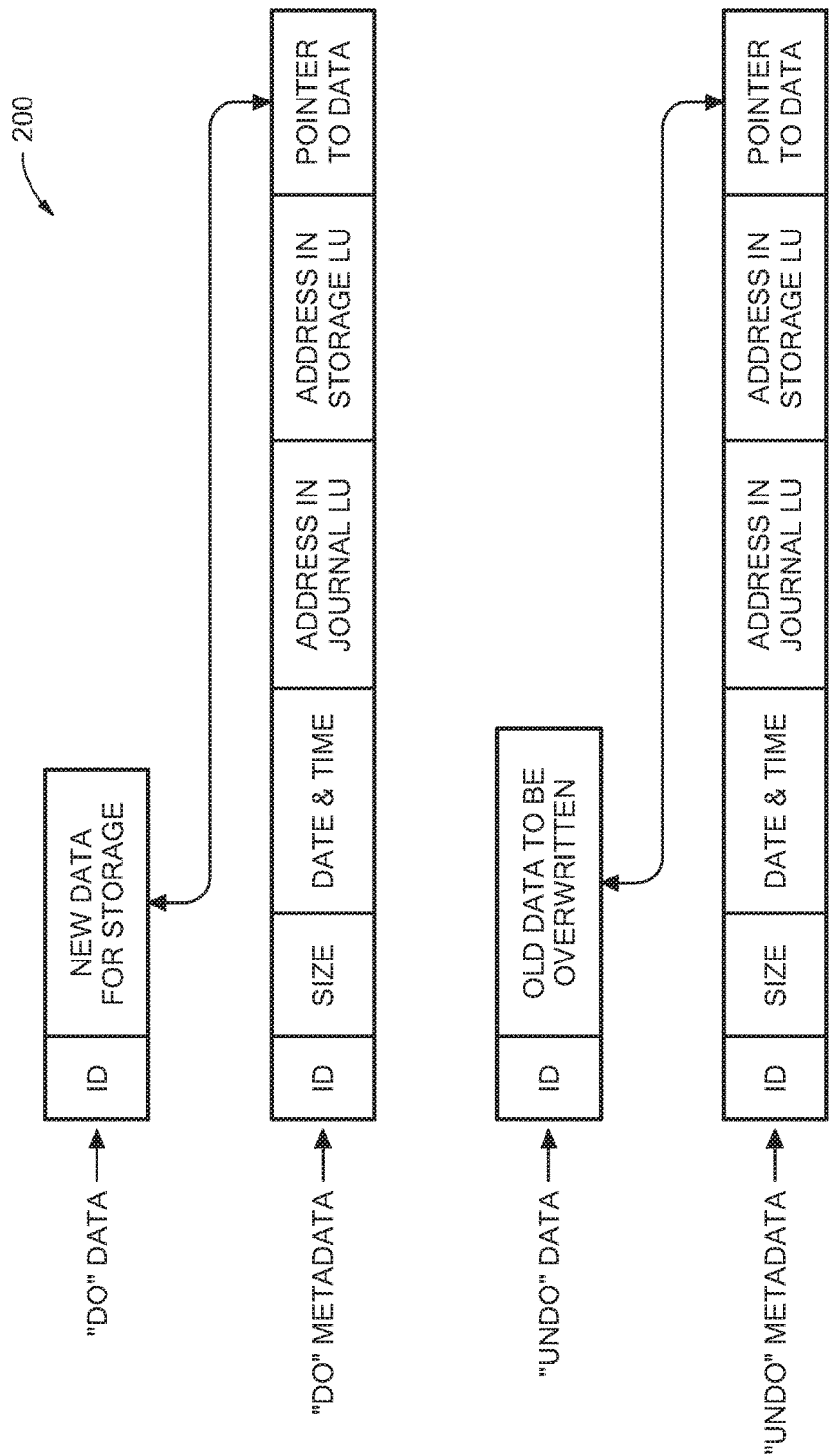
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

In some embodiments, a consistency group (CG) may be a set of logical units (LUs) or virtual machines which are replicated together for which write order fidelity is preserved.

A CG construct take significant amount of resources from the system, and thus the amount of CGs the system can run is limited. Hence, it is resource prohibitive to generate a CG construct for every virtual machine replicated in some cases. In response to these constraints multiple unrelated virtual machines or LUs are grouped in a single CG. On the other hand, a CG also has limited performance and thus if the CG includes entities which have too high of a performance requirement, it may be better to separate the CG into several CG constructs. Thus, it is desirable to unify multiple CGs into a single CG and be able to separate CG into more than one CG.

A new virtual CG may be formed which may include several internal CGs. The virtual CG may be presented to the user and the user may be able to perform all actions on the virtual CG. Internally, in some examples, each internal CG may replicate just some of the stripes of the volumes. As well as consistency point may be achieved across internal CGs. That is, it may be possible to form an image of a particular time by rolling each internal CG group to that time. In some examples, the internal CGs may not be exposed to the user and all actions happen automatically on the internal CGs when performed on the virtual CG. Internal CG groups may also be referred to as Grid Copies. In a further example, one box may be accepting all the I/Os, this box will split the I/Os between relevant boxes running the consistency groups. In one example, each grid CG may receive its own IOs.

In cloud platforms, using the processes described in FIGS. 1 and 2, data protection system 100 faces a number of challenges and biggest among them are scalability issues. One way to solve such issues is the ability to unify or separate the data processing according to the needs of the system or a user.

For example, suppose a user tries to replicate 1000 low traffic virtual machines (VMs). In current system architecture the only choices for system configuration are: 1. define a separate consistency group (CG) for each VM; or 2. put a number of VMs in the same CG and make less CGs.

The first configuration will use a lot of resources in the replication process. For example, each group will require separate journal space, separate memory reservations. In practice, the system will reach its memory, CPU and disk space limits despite the fact that traffic is low.

The second configuration has two major problems. In the first problem, operations "Test copy", "Failover" and "Recover production" can be done for a CG only so that if one VM has a data corruption on production site the problem cannot be fixed without destroying the production copy for other VMs. In the second problem, if a VM in CG has a traffic peak the CG will enter a high load state and replication from all VMs in the CG will be stopped.

The solution of the problem involves keeping a number of VMs in one CG until a problem occurs and then separate out the VM into a new CG. When the problems pass merging the VM back into the old CG. Techniques to accomplish these objectives are further described herein.

Figure 3:
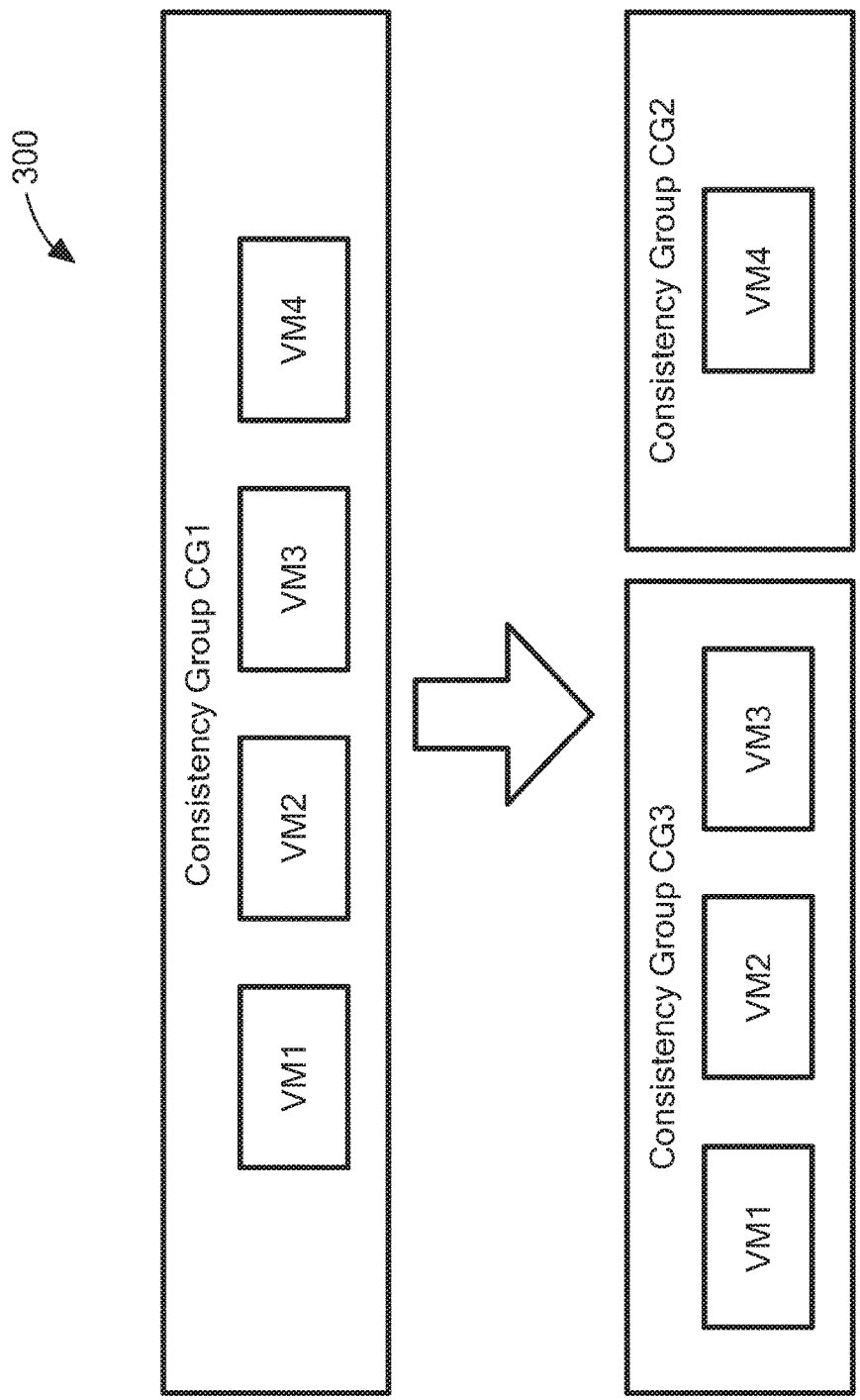
FIG. 3 is a block diagram of an example of separating a virtual machine into a separate consistency group, according to one embodiment of the disclosure.

Referring to FIG. 3, a diagram 300 is an example of separating a virtual machine into a separate consistency group, according to one embodiment of the disclosure. In this example, a consistency group CG1 includes a first virtual machine VM1, a second virtual machine VM2, a third virtual machine VM3 and a fourth virtual machine VM4. VM4 needs to be separated from CG1 due to performance issues such high IOPS (Input/Output Operations Per Second), for example. Thus, a consistency group CG2 is formed with VM4.

Figure 4:
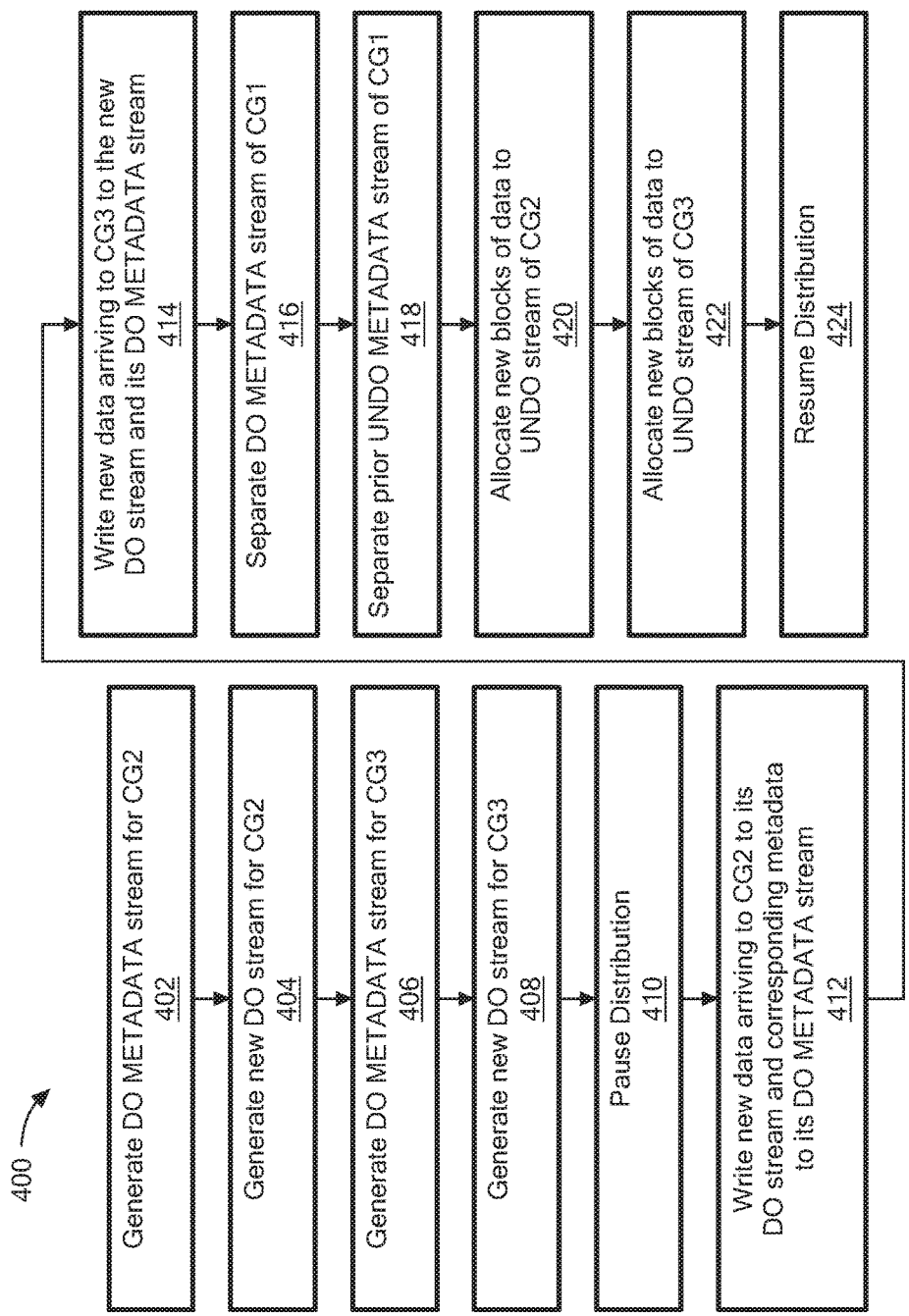
FIG. 4 is a flowchart of an example of a process to separate a virtual machine into a separate consistency group, according to one embodiment of the disclosure.

FIG. 4 is a flowchart of an example of a process to separate a virtual machine into a separate consistency group as shown in FIG. 3, according to one embodiment of the disclosure. For example, process 400 splits a consistency group, CG2 having a first virtual machine (VM1), a second virtual machine (VM2), a third virtual machine (VM3) and a fourth virtual machine (VM4) and forms two new consistency group, CG2 for VM4 and CG3 for VM1, VM2 and VM3.

Process 400 generates a new DO METADATA stream for CG2 (402) and generates a new DO stream for CG2 (404). Process 400 generates a new DO METADATA stream for CG3 (406) and generates a new DO stream for CG3 (408).

Process 400 pauses distribution (410). For example, no data is read from a DO streams and moved to an UNDO stream.

Process 400 writes new data arriving to CG2 to its DO stream and the corresponding metadata to its DO METADATA stream (412). For example, data from new I/Os arriving to VM4 are written to the DO stream generated in processing block 404 and the corresponding metadata from the new I/Os arriving to VM4 are written to the DO METADATA stream generated in processing block 402.

Process 400 writes new data arriving to CG3 to its DO stream and the corresponding metadata to its DO METADATA stream (414). For example, data from new I/Os arriving to VM1 is written to the DO stream generated in processing block 408 and the corresponding metadata from these new I/Os is written to the DO METADATA stream generated in processing block 406.

Process 400 separates the DO METADATA stream of CG1 (416). For example, a background process separates the metadata DO stream of CG1 into the beginning of the metadata streams of CG2, CG3 respectively. For example, process 400 copies metadata entries which relate to VM4 to the DO METADATA stream of CG2 and of VM1, VM2, VM3 to the DO METADATA stream of CG1. Since the metadata includes pointers to the locations of the storage where the data corresponding to the metadata exists in the DO stream when the distribution process continues (e.g., data is read from a DO stream and moved to an UNDO stream), it can access the data and apply it to the remote storage. In one particular example, for each block referenced, the reference count is increased by 1.

Process 400 separates the UNDO METADATA stream of CG1 (418). For example, a background process separates the metadata UNDO stream of CG1 into the beginning of the metadata streams of CG2, CG3 respectively. For example, process 400 copies metadata entries which relate to VM4 to the UNDO METADATA stream of CG2 and of VM1, VM2 and VM3 to the UNDO METADATA stream of CG1. In one particular example, for each block referenced, the reference count is increased by 1.

Process 400 allocates new blocks of data to the UNDO stream of CG2 (420) and allocates new blocks of data to the UNDO stream of CG3 (422).

Process 400 resumes distribution process (424). For example, data is read from the DO streams and moved to the UNDO streams. In one example, after a new data is written to VM4 the data is sent to the UNDO stream of CG2. In another example, after a data is written to VM1 the data is sent to the UNDO stream of CG3.

In one example, each stream of data is a list of blocks with relatively large size (e.g., 100 MB). The reason the streams are a list of blocks is to be able to sequentially write data to the storage as sequential writes, which are much faster for spindle-type storage. When data is distributed and data from a block is moved from the DO stream to the UNDO stream the block is erased and returns to the free block pool. Since after the separation into two streams a block may belong to two separate streams. A block can be erased only when it can be erased from the perspective of the two streams. For this reason a reference count is added to each block and when one stream wants to erase the block is just reduces the reference count. When the reference count reaches 0 the block is returned to the free pool block.

After the separation of the data streams, some operations may temporarily be less sequential as the data of a single CG may not be continuous in a single block. Caching and similar optimization may reduce the amount of non-sequential reads. As new data is written sequentially to each CG operations will return to be sequential eventually.

Figure 5:
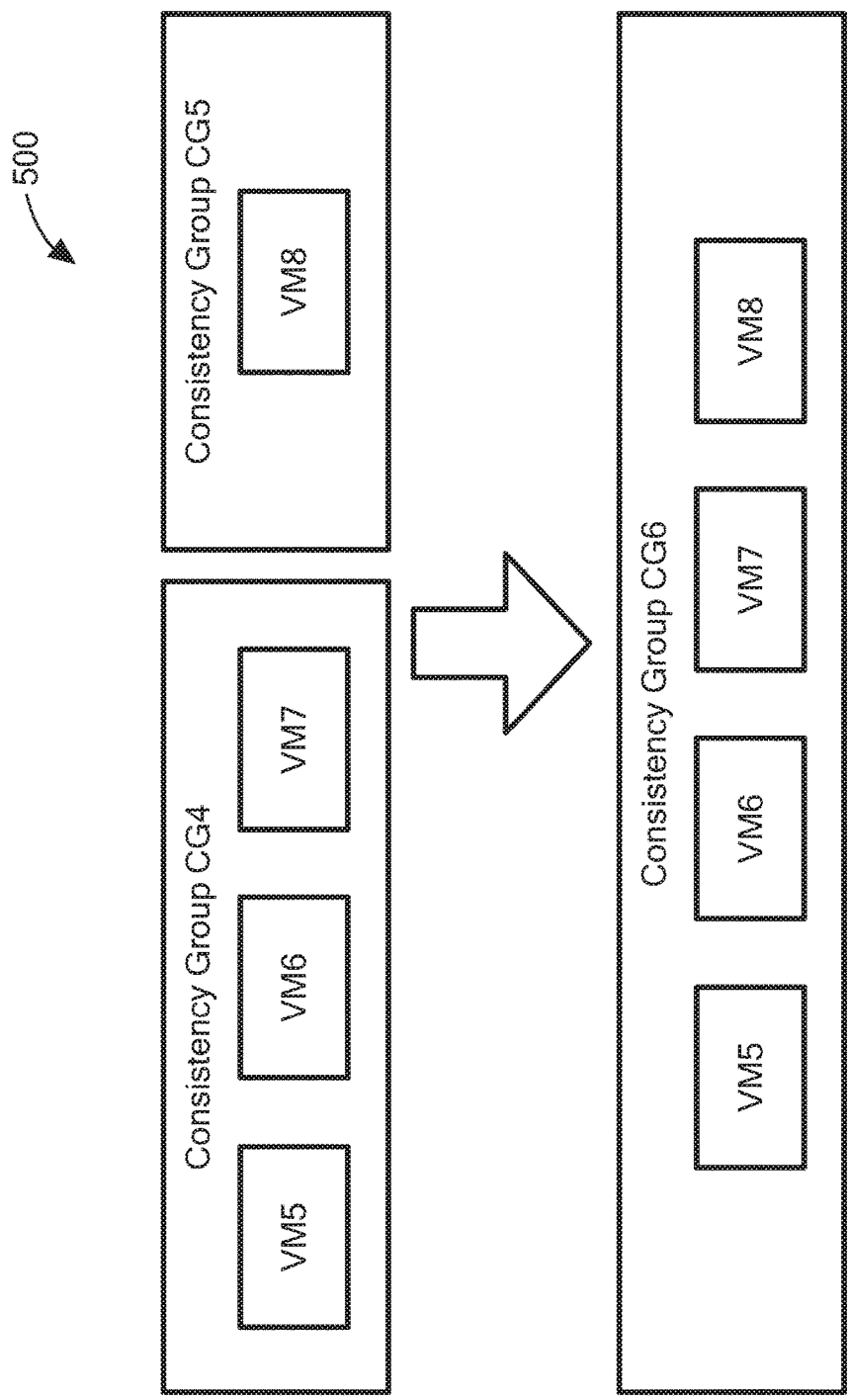
FIG. 5 is a block diagram of an example of joining consistency groups, according to one embodiment of the disclosure.

Referring to FIG. 5, a diagram 500 is an example of joining consistency groups, according to one embodiment of the disclosure. In this example, a consistency group CG4 includes a fifth virtual machine VM5, a sixth virtual machine VM6 and a seventh virtual machine VM7. A consistency group CG5 includes an eighth virtual machine VM8. CG4 is joined with CG5 to form CG6 that includes VM5, VM6, VM7 and VM8.

Figure 6:
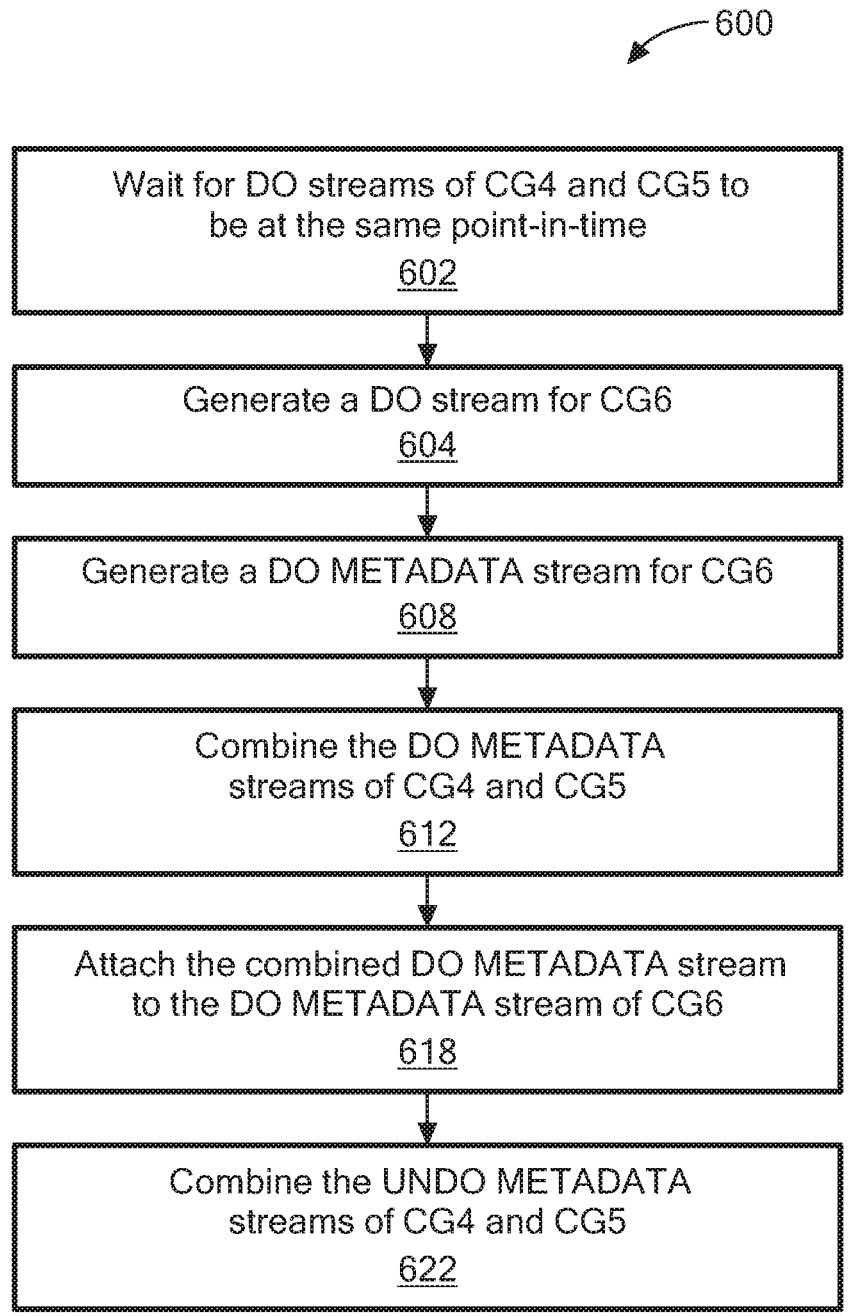
FIG. 6 is a flowchart of an example of a process to join consistency groups, according to one embodiment of the disclosure.

FIG. 6 is a flowchart of an example of a process to join consistency groups as shown in FIG. 5, according to one embodiment of the disclosure. For example, process 600 CG4 is combined with CG5 to form CG6. In one example, process 600 is performed without losing journal data and without copying data.

Process 600 waits for the DO streams of CG4 and CG5 to be at the same point-in-time (602). A problem may arise if the DO stream of CG4 is updated to a later point-in-time than the DO stream of CG5 or visa-versa. Therefore, process 600 waits for the CG4 and CG5 to be at the same point-in-time in their respective DO streams. For example, this is performed by rolling the CG which points to an earlier point-in-time while stopping the rolling of the other CG.

Process 600 generates a DO stream for CG6 (604) and generates a DO METADATA stream (608). For example, all the new I/Os generated by VM5, VM6, VM7 and VM8 will be sent to the DO stream for CG6 and the metadata for these new I/Os will be sent to the DO METADATA stream for CG6.

Process 600 combines the DO METADATA streams of CG4 and CG5 (612). For example, the DO METADATA stream of CG4 and the DO METADATA stream of CG5 are combined to form a new DO METADATA stream. For example, the list of metadata of the two CGs is interlaced into a single metadata stream according to the order of the timestamps.

Process 600 attaches the combined DO METADATA streams of CG4 and CG5 to the DO METADATA steam of CG6 (618). For example, the new DO METADATA stream formed in processing block 612 is attached to the beginning of the DO METADATA stream of CG6.

Process 600 combines the UNDO METADATA streams of CG4 and CG5 (622). For example, the UNDO METADATA stream of CG4 and the UNDO METADATA stream of CG5 are combined to form a new UNDO METADATA stream. As data is distributed from the DO stream to the UNDO stream and old blocks of the UNDO stream are erased the data of the combined CG, becomes sequential on single blocks.

Figure 7:
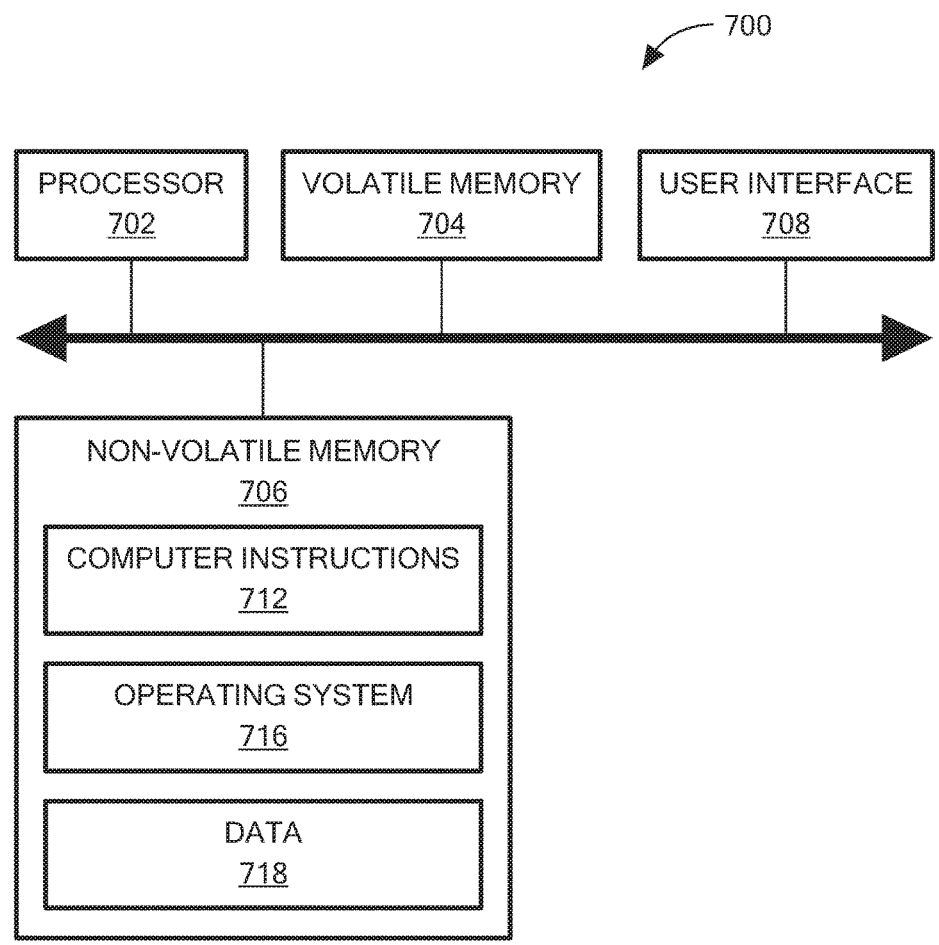
FIG. 7 is a computer on which any of the processes of FIGS. 4 and 6 may be implemented, according to one embodiment of the disclosure.

Referring to FIG. 7, in one example, a computer 700 includes a processor 702, a volatile memory 704, a non-volatile memory 706 (e.g., hard disk) and the user interface (UI) 708 (e.g., a graphical user interface, a mouse, a keyboard, a display, touch screen and so forth), according to one embodiment of the disclosure. The non-volatile memory 706 stores computer instructions 712, an operating system 716 and data 718. In one example, the computer instructions 712 are executed by the processor 702 out of volatile memory 704 to perform all or part of the processes described herein (e.g., processes 400 and 600).

The processes described herein (e.g., processes 400 and 600) are not limited to use with the hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400 and 600 are not limited to the specific processing order of FIGS. 4 and 6, respectively. Rather, any of the processing blocks of FIGS. 4 and 6 may be re-ordered, combined or removed, performed in parallel or in serial, as necessary, to achieve the results set forth above.

The processing blocks (for example, in the processes 400 and 600) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:
1. A method comprising:
separating a set of virtual machines from a first consistency group to a second consistency group and third consistency group; and
combining a first virtual machine of the second consistency group to the third consistency group to form a fourth consistency group,
wherein the set of virtual machines in the first consistency group are replicated together for which write order fidelity is preserved;
wherein virtual machines in the fourth consistency group are replicated together for which write order fidelity is preserved;
wherein combining the first virtual machine of the second consistency group to the third consistency group to form the fourth consistency group comprises:
generating a DO stream for the fourth consistency group;
generating a DO METADATA stream for the fourth consistency group;
combining DO METADATA streams of the second consistency group and the third consistency group to form a combined DO METADATA;
attaching the combined DO METADATA to the DO METADATA stream of the fourth consistency group;
combining UNDO METADATA streams of the second and third consistency groups; and
after writing new data to the fourth consistency group, sending the new data to an UNDO stream of the second consistency group;
wherein combining the first virtual machine of the second consistency group to a third consistency group further comprises waiting for the second consistency group and the third consistency group to be distributed at the same point of time, wherein distribution at the same point of time is performed by rolling one of the second consistency group and the third consistency group that points to an earlier point in time while stopping rolling of the other of the second consistency group and the third consistency group.

2. The method of claim 1, wherein combining the first virtual machine of the second consistency group to a third consistency group to form a fourth consistency group comprises combining the first virtual machine of the second consistency group to a third consistency group to form a fourth consistency group without losing journal and without data copying.

3. The method of claim 1, wherein separating a set of virtual machines from a first consistency group to a second consistency group and third consistency group comprises:
generating a DO METADATA stream and DO stream for the second consistency group;
generating a DO METADATA stream and DO stream for the third consistency group;
pausing distribution of data, the pausing comprising stopping reads of data from the DO streams and movement to the UNDO streams;
writing data from new I/Os arriving to the second consistency group to its DO stream and corresponding metadata to its DO METADATA stream; and
writing data from new I/Os arriving to the third consistency group to its DO stream and corresponding metadata to its DO METADATA stream.

4. The method of claim 3, wherein separating a set of virtual machines from a first consistency group to a second consistency group and third consistency group further comprises:
separating a DO METADATA stream of the first consistency group into the DO METADATA streams of the second and third consistency groups; and
separating an UNDO METADATA stream of the first consistency group into UNDO METADATA streams of the second and third consistency groups.

5. The method of claim 4, wherein each of the DO stream, UNDO stream, DO METADATA stream, and UNDO METADATA stream comprises a list of blocks, wherein when data from one of the blocks is moved from one of the streams to another, the corresponding one of the blocks is erased and returned to a block pool.

6. The method of claim 5, wherein after separating the DO METADATA stream of the first consistency group into the DO METADATA streams of the second and third consistency groups, and after separating the UNDO METADATA stream of the first consistency group into UNDO METADATA streams of the second and third consistency groups, the method further comprises:

identifying a block belonging to both streams and erasing the block belonging to both streams after the movement only when it can be erased from both streams.

7. An apparatus, comprising:
a processor and a memory configured to:
   separate a set of virtual machines from a first consistency group to a second consistency group and third consistency group;
   combine a first virtual machine of the second consistency group to the third consistency group to form a fourth consistency group,
      wherein the set of virtual machines in the first consistency group are replicated together for which write order fidelity is preserved;
      wherein virtual machines in the fourth consistency group are replicated together for which write order fidelity is preserved;
wherein the processor and memory configured to combine the first virtual machine of the second consistency group to the third consistency group to form the fourth consistency group comprises circuitry configured to:
generate a DO stream for the fourth consistency group;
generate a DO METADATA stream for the fourth consistency group;
combine DO METADATA streams of the second consistency group and the third consistency group to form a combined DO METADATA;
attach the combined DO METADATA to the DO METADATA stream of the fourth consistency group;
combine UNDO METADATA streams of the second and third consistency groups; and
after writing new data to the fourth consistency group, sending the new data to an UNDO stream of the second consistency group,
wherein combining the first virtual machine of the second consistency group to a third consistency group further comprises waiting for the second consistency group and the third consistency group to be distributed at the same point of time, wherein distribution at the same point of time is performed by rolling one of the second consistency group and the third consistency group that points to an earlier point in time while stopping rolling of the other of the second consistency group and the third consistency group.

8. The apparatus of claim 7, wherein the processor and the memory are configured to combine the first virtual machine of the second consistency group to a third consistency group to form a fourth consistency group comprises circuitry configured to combine the first virtual machine of the second consistency group to a third consistency group to form a fourth consistency group without losing journal and without data copying.

9. The apparatus of claim 7, wherein the processor and the memory configured to separate a set of virtual machines from a first consistency group to a second consistency group and third consistency group comprises circuitry configured to:
   generate a DO METADATA stream and DO stream for the second consistency group;
   generate a DO METADATA stream and DO stream for the third consistency group;
   pause distribution of data by stopping reads of data from the DO streams and movement to the UNDO streams;
   write data from new I/Os arriving to the second consistency group to its DO stream and corresponding metadata to its DO METADATA stream; and
   write data from new I/Os arriving to the second third consistency group to its DO stream and corresponding metadata to its DO METADATA stream.

10. The apparatus of claim 9, wherein the processor and the memory configured to separate a set of virtual machines from a first consistency group to a second consistency group and third consistency group comprises circuitry configured to:
   separate a DO METADATA stream of the first consistency group into the DO METADATA streams of the second and third consistency groups; and
   separate an UNDO METADATA stream of the first consistency group into UNDO METADATA streams of the second and third consistency groups.

11. An article comprising:
a non-transitory computer-readable medium that stores computer-executable instructions, the instructions causing a machine to:
   separate a set of virtual machines from a first consistency group to a second consistency group and third consistency group; and
   combine a first virtual machine of the second consistency group to the third consistency group to form a fourth consistency group,
wherein the set of virtual machines in the first consistency group are replicated together for which write order fidelity is preserved;
wherein virtual machines in the fourth consistency group are replicated together for which write order fidelity is preserved;
wherein the instructions causing the machine to combine the first virtual machine of the second consistency group to the third consistency group to form the fourth consistency group comprises instructions causing the machine to combine:
generate a DO stream for the fourth consistency group;
generate a DO METADATA stream for the fourth consistency group;
combine DO METADATA streams of the second consistency group and the third consistency group to form a combined DO METADATA;
attach the combined DO METADATA to the DO METADATA stream of the fourth consistency group;
combine UNDO METADATA streams of the second and third consistency groups; and
after writing new data to the fourth consistency group, sending the new data to an UNDO stream of the second consistency group;
wherein combining the first virtual machine of the second consistency group to a third consistency group further comprises waiting for the second consistency group and the third consistency group to be distributed at the same point of time, wherein distribution at the same point of time is performed by rolling one of the second consistency group and the third consistency group that points to an earlier point in time while stopping rolling of the other of the second consistency group and the third consistency group.

12. The article of claim 11, wherein the instructions causing the machine to combine the first virtual machine of the second consistency group to a third consistency group to form a fourth consistency group comprises instructions causing the machine to combine the first virtual machine of the second consistency group to a third consistency group to form a fourth consistency group without losing journal and without data copying.

13. The article of claim 11, wherein the instructions causing the machine to separate a set of virtual machines from a first consistency group to a second consistency group and third consistency group comprises instructions causing the machine to:
- generate a DO METADATA stream and DO stream for the second consistency group;
- generate a DO METADATA stream and DO stream for the third consistency group;
- pause distribution of data by stopping reads of data from the DO streams and movement to the UNDO streams;
- write data from new I/Os arriving to the second consistency group to its DO stream and corresponding metadata to its DO METADATA stream; and
- write data from new I/Os arriving to the second third consistency group to its DO stream and corresponding metadata to its DO METADATA stream.

14. The article of claim 13, wherein the instructions causing the machine to separate a set of virtual machines from a first consistency group to a second consistency group and third consistency group further comprises instructions causing the machine to:
- separate a DO METADATA stream of the first consistency group into the DO METADATA streams of the second and third consistency groups; and
- separate an UNDO METADATA stream of the first consistency group into UNDO METADATA streams of the second and third consistency groups.

* * * * *